(12) United States Patent
Revelino et al.

(10) Patent No.: US 9,221,378 B2
(45) Date of Patent: Dec. 29, 2015

(54) SLIDE-OUT ROOM MECHANISM FOR A VEHICLE

(71) Applicant: AL-KO Kober A.G., Kitze (DE)

(72) Inventors: Larry Revelino, Norco, CA (US); Emmanuel Camus, Goshen, IN (US)

(73) Assignee: AL-KO Kober A.G., Kotze (DE)

( * ) Notice: Subject to any disclaimer, the term of this patent is extended or adjusted under 35 U.S.C. 154(b) by 0 days.

(21) Appl. No.: 13/875,173

(22) Filed: May 1, 2013

(65) Prior Publication Data

US 2014/0138976 A1    May 22, 2014

Related U.S. Application Data

(60) Provisional application No. 61/728,794, filed on Nov. 20, 2012.

(51) Int. Cl.
*B60P 3/34* (2006.01)
*B60P 1/56* (2006.01)

(52) U.S. Cl.
CPC ........................................ *B60P 3/34* (2013.01)

(58) Field of Classification Search
CPC ............... B60P 3/34; B60P 3/06; B60P 3/32; B60P 3/341; B60P 3/36; B60P 3/0252
USPC ................ 296/26.13, 26.02, 26.12, 170–172, 296/174–176, 165–166, 156; 52/79.5, 143, 52/64, 122.1, 79.1; 293/26.13, 26.02, 293/26.12, 170–172, 174–176, 165–166, 293/156
See application file for complete search history.

(56) References Cited

U.S. PATENT DOCUMENTS

| 2,744,781 | A | 5/1956 | Black |
| 2,877,509 | A | 3/1959 | Klibanow |
| 2,965,412 | A | 12/1960 | Henderson et al. |
| 3,137,041 | A | 6/1964 | Mullen |
| 5,050,927 | A | 9/1991 | Montanari |
| 5,237,782 | A | 8/1993 | Cooper |

(Continued)

FOREIGN PATENT DOCUMENTS

| EP | 0065398 A1 | 11/1982 |
| WO | WO0220309 A2 | 3/2002 |

OTHER PUBLICATIONS

U.S. Pat. No. 7,370,900, "Petition for *Inter Partes Review*." in proceeding No. 2015-01374 dated Jun. 11, 2015, 64 pages.

(Continued)

*Primary Examiner* — Glenn Dayoan
*Assistant Examiner* — Sunsurraye Westbrook
(74) *Attorney, Agent, or Firm* — Inskeep IP Group, Inc.

(57) ABSTRACT

A slide-out system having a first and second slide-out assembly which are fixed to a first and second side of a slide-out room respectfully. Each assembly preferably includes an upper and lower gear rack fixed to the respective side of the slide-out room. An electric motor is connected to a drive gear that engages the top gear rack, driving movement of the slide-out room. This movement is distributed or synchronized with a lower portion of the room by an axle having a top gear engaged with the top gear rack and a bottom gear engaged with the bottom gear rack. Since the axle is not directly connected to the motor, it acts solely as a secondary synchronization mechanism between the top and bottom of the room.

23 Claims, 16 Drawing Sheets

(56) References Cited

U.S. PATENT DOCUMENTS

| | | | |
|---|---|---|---|
| 5,248,180 A | 9/1993 | Hussaini | |
| 5,491,933 A | 2/1996 | Miller et al. | |
| 5,560,667 A | 10/1996 | Edry | |
| 5,634,683 A * | 6/1997 | Young | 296/165 |
| 5,706,612 A | 1/1998 | Tillett | |
| 5,758,918 A | 6/1998 | Schneider et al. | |
| 5,791,715 A | 8/1998 | Nebel | |
| 5,800,002 A | 9/1998 | Tiedge et al. | |
| 5,894,698 A | 4/1999 | Dewald, Jr. et al. | |
| 5,902,001 A * | 5/1999 | Schneider | 296/26.13 |
| 5,915,774 A | 6/1999 | Tiedge | |
| 5,971,471 A | 10/1999 | Gardner | |
| 6,003,919 A * | 12/1999 | Shook | 296/26.14 |
| 6,116,671 A | 9/2000 | Schneider | |
| 6,152,520 A | 11/2000 | Gardner | |
| 6,227,607 B1 | 5/2001 | Dewald, Jr. et al. | |
| 6,234,566 B1 | 5/2001 | Cry et al. | |
| 6,254,171 B1 | 7/2001 | Young, Sr. | |
| 6,293,611 B1 | 9/2001 | Schneider et al. | |
| 6,325,437 B2 | 12/2001 | Hiebert et al. | |
| 6,345,854 B1 | 2/2002 | McManus | |
| 6,415,675 B1 | 7/2002 | Schneider et al. | |
| 6,422,628 B1 | 7/2002 | Bortell | |
| 6,454,336 B1 | 9/2002 | Nye et al. | |
| 6,471,275 B1 | 10/2002 | Kunz et al. | |
| 6,494,518 B2 | 12/2002 | Kreil et al. | |
| 6,568,734 B2 | 5/2003 | Buls et al. | |
| 6,619,713 B2 | 9/2003 | Eichhorn | |
| 6,696,813 B2 | 2/2004 | McManus et al. | |
| 6,729,670 B1 | 5/2004 | Buls et al. | |
| 6,783,164 B2 | 8/2004 | Bortell | |
| 6,796,590 B2 | 9/2004 | Schneider | |
| 6,871,897 B1 * | 3/2005 | Snyder | 296/26.13 |
| 6,896,307 B2 | 5/2005 | Nye et al. | |
| 6,905,154 B1 | 6/2005 | Buls et al. | |
| 6,948,754 B2 | 9/2005 | Huffman et al. | |
| 6,976,721 B2 | 12/2005 | Rasmussen | |
| 7,052,065 B2 | 5/2006 | Rasmussen | |
| 7,150,483 B2 | 12/2006 | Rasmussen | |
| 7,175,219 B1 | 2/2007 | Blodgett, Jr. | |
| 7,229,123 B2 | 6/2007 | Kunz | |
| 7,234,747 B2 * | 6/2007 | Rasmussen | 296/26.01 |
| 7,258,389 B2 | 8/2007 | Franzini | |
| 7,370,900 B1 * | 5/2008 | Blodgett, Jr. | 296/26.12 |
| 7,374,218 B2 | 5/2008 | Schneider | |
| 7,461,480 B1 | 12/2008 | Gardner | |
| 7,540,549 B2 | 6/2009 | Revelino et al. | |
| 7,607,365 B1 * | 10/2009 | Courser | 74/89.11 |
| 7,614,675 B2 | 11/2009 | Kunz | |
| 7,871,114 B2 | 1/2011 | Schultz et al. | |
| 8,235,455 B2 | 8/2012 | Schwindaman et al. | |
| 8,240,744 B2 | 8/2012 | Schwindaman et al. | |
| 8,317,250 B2 | 11/2012 | Schwindaman et al. | |
| RE44,002 E | 2/2013 | Schwindaman et al. | |
| 8,573,666 B2 | 11/2013 | Schwindaman et al. | |
| 2002/0084664 A1 * | 7/2002 | McManus et al. | 296/26.13 |
| 2002/0171255 A1 * | 11/2002 | Eichhorn | 296/26.01 |
| 2004/0094983 A1 | 5/2004 | Bortell | |
| 2005/0230989 A1 | 10/2005 | Nebel | |
| 2006/0131912 A1 * | 6/2006 | MacLean | 296/26.13 |
| 2010/0066025 A1 | 3/2010 | Kreil | |
| 2010/0122595 A1 * | 5/2010 | Sung et al. | 74/409 |

OTHER PUBLICATIONS

U.S. Pat. No. 8,573,666, "Petition for *Inter Partes* Review of U.S. Pat. No. 8,573,666 Under 35 U.S.C. §§ 311-319 and 37 C.F.R. § 42.100 *et seq*." in proceeding No. 2014-00313 dated Dec. 31, 2013, 61 pages.

U.S. Pat. No. 8,235,455, "Petition for *Inter Partes* Review of U.S. Pat. No. 8,235,455 Under 35 U.S.C. §§ 311-319 and 37 C.F.R. § 42.100 *et seq*." in proceeding No. 2014-00213 dated Dec. 2, 2013, 65 pages.

U.S. Pat. No. 8,240,744, "Petition for *Inter Partes* Review of U.S. Pat. No. 8,240,744 Under 35 U.S.C. §§ 311-319 and 37 C.F.R. § 42.100 *et seq*." in proceeding No. 2014-00211 dated Dec. 2, 2013, 64 pages.

* cited by examiner

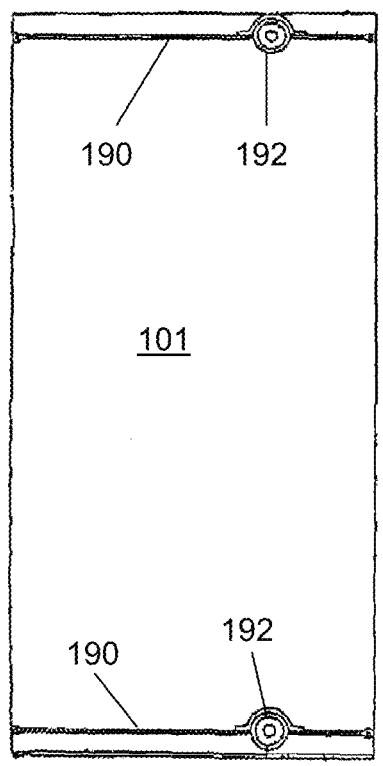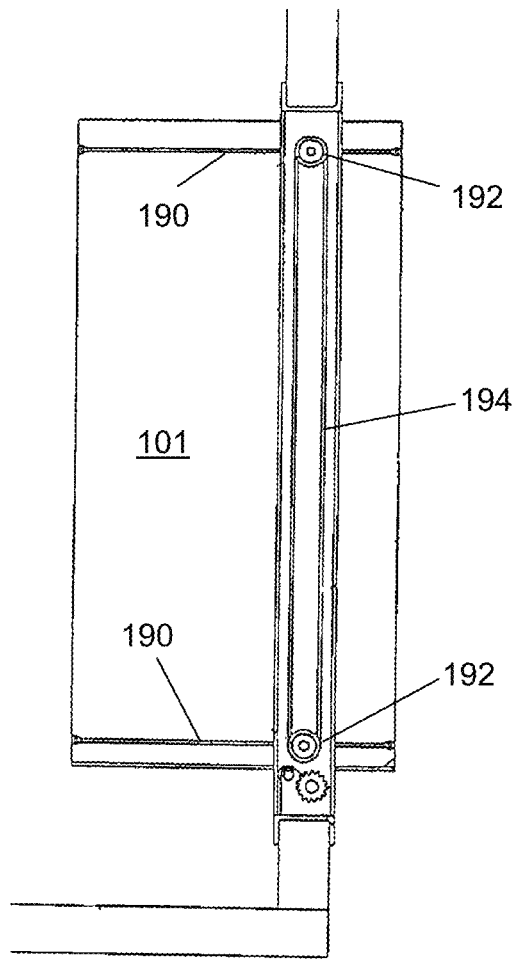
Figure 28
Prior Art
Figure 29
Prior Art

SLIDE-OUT ROOM MECHANISM FOR A VEHICLE

RELATED APPLICATIONS

This application claims priority to U.S. Provisional Application Ser. No. 61/728,794 filed Nov. 20, 2012 entitled Slide-Out Room Mechanism For A Vehicle, which is hereby incorporated herein by reference in its entirety.

BACKGROUND OF THE INVENTION

The embodiments set forth in this specification relate to mechanisms for moving a slide-out room into or out of a vehicle. An example slide-out mechanism and vehicles can be seen in U.S. Pat. No. 7,370,900, the contents of which are incorporated herein by reference.

In order to increase the available interior space of a motorized or towable vehicle such as a motor home or trailer, these vehicles have been designed to include slide-out rooms. When the vehicle is in transit, the slide-out room is retracted and stored in the vehicle's interior with the exterior wall of the slide-out room approximately flush with the vehicle's exterior. As a result, there is typically adequate space within the vehicle's interior to accommodate users in transit and remain within the standard width limitations imposed upon a vehicle. When the vehicle is parked and leveled, the slide-out room is then slid outward through an opening formed in a sidewall of the vehicle thereby, increasing the internal accommodations.

Typically, slide-out rooms include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form an L-shaped configuration with the respective roof section, first sidewall section and second sidewall section. The stop walls engage the inner surface of a respective sidewall section of the fixed room when the slide-out room is fully extended, and thereby limit the travel of the slide-out room.

Many slide-out room designs include a manual or motorized mechanism for extending or retracting the slide-out room from a vehicle. For example, U.S. Patent Application 2004/0007890 entitled Room Expansion System, filed Jun. 25, 2003, and U.S. Pat. No. 5,833,296 entitled Motor-Operated Slide-Out Drive System With Releasable Brake, issued Nov. 10, 1998, each of which are hereby incorporated by reference. As seen in these example patents, the slide-out mechanism often includes a gear rack fixed beneath the slide-out room floor with at least one gear mounted to the vehicle and engaged with the gear rack. Thus, the gear rack and slide-out room are moved as the gear rotates either from a manual crank or a connected motor.

A significant benefit to this type of drive gearing is its simplicity. Moreover, heavy-duty gearing used in such a design typically increases the lifespan of the mechanism. Yet, with this type of gearing design most of the motive force is concentrated and exerted at the bottom of the room. This localized load on the bottom surface of the room can often create uneven slide-out conditions between the slide-out room's bottom portion (where the load is concentrated) and the top portion (where there is very little load).

Furthermore, due to the size of some slide-out rooms, the top of the slide-out room may be caused to move relative to bottom if pushed, bumped, or otherwise moved due to the "play" that exists in this type of gearing design. This "play" at the top of the slide-out room can intermittently unseal the slide-out room from the vehicle body when the slide-out room is in the closed position. Thus, dirt, water or other undesirable elements may enter the vehicle body thus making the vehicle interior unsightly or even causing damage.

At times, however, uneven extension or retraction of a slide-out room has been designed into the slide-out mechanism. For example, some prior art flush floor slide-out room designs extend and retract the slide-out room at varying angles to easily and efficiently extend to a flush position with the floor of the main vehicle body. However, it is preferable that the slide-out room retract to a substantially level position.

SUMMARY OF THE INVENTION

One embodiment of the present invention is directed to a slide-out system having a first and second slide-out assembly fixed to a first and second side of a slide-out room respectfully. Each assembly preferably includes an upper and lower gear rack fixed to the respective side of the slide-out room. An electric motor is connected to a drive gear that engages the top gear rack, driving movement of the slide-out room. This movement is distributed or synchronized with a lower portion of the room by an axle having a top gear engaged with the top gear rack and a bottom gear engaged with the bottom gear rack. Since the axle is not directly connected to the motor, it acts solely as a secondary synchronization mechanism between the top and bottom of the room.

Another embodiment of the present invention allows a user to easily replace a motor of a slide-out system from the interior or exterior of the slide-out room and without the need to remove the entire slide-out room and slide-out system from the vehicle. More specifically, side channels of the system include inner and outer flexible flap seals than can be pulled back by a user to expose the motor. The motor is mounted to a support structure and drive gear in a way that either lacks any vertical retaining mechanism or includes a mechanism that is easily disengaged. Hence a user can vertically move the motor upwards (e.g., by prying with a screw driver). For example, the motor may include a plurality of vertical mounting posts that engage a plurality of matching apertures in the mounting bracket.

In another aspect of the present invention, slide-out mechanism can be attached to the slide-out room when both are located outside of the vehicle (i.e., the slide-out room is detached from the vehicle). Once attached, the room and system can be placed in an aperture of a vehicle such that the system's side channels engage a portion of the vehicle's walls. Finally, a flange member can be added to and engaged with the channel so as to clamp onto an inner surface of the vehicle's wall in one configuration or to clamp onto an outer surface of the vehicle's wall in another configuration. Hence, the slide-out system by be more easily installed as a "single" unit on each side of the room, instead of installing portions of the system separately on the vehicle and slide-out room before lifting the slide-out room into the vehicle's aperture.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIGS. 28 and 29 illustrate prior art gear linkages.

DESCRIPTION OF EMBODIMENTS

Figure 1:
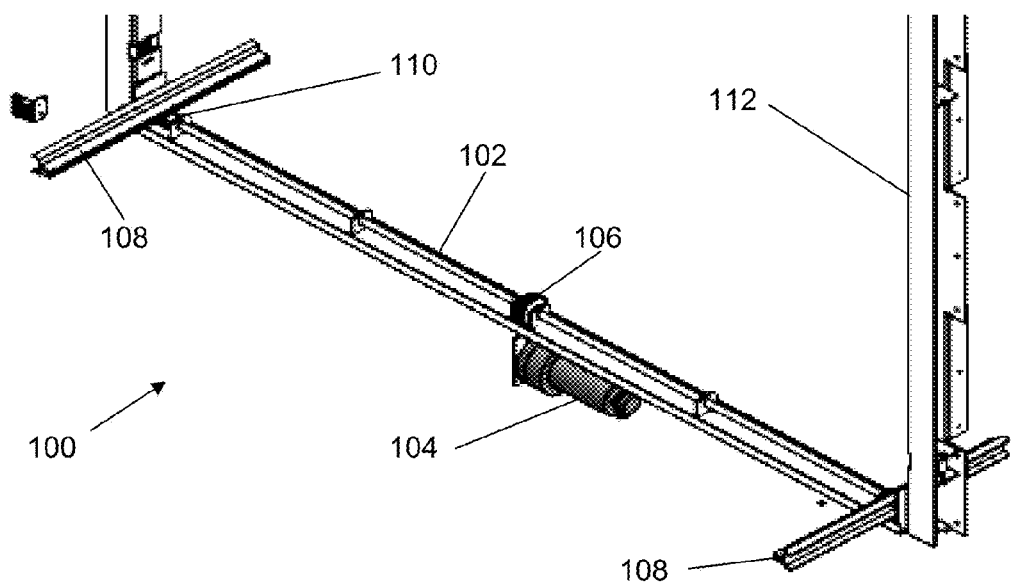
FIG. 1 illustrates a perspective view of a slide-out system according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIGS. 1-6 illustrate an embodiment of a slide-out mechanism 100 that moves a room into and out of an aperture of a vehicle (e.g., a recreation vehicle). As described in detail below, the mechanism 100 has a motorized assembly, shown in FIG. 1, which advances or retracts a slide-out room from a vehicle while a separate equalizing assembly 123 distributes force from a lower portion of the slide-out room 101 to an upper portion of the slide-out room 101. While a motorized system is described below, it should be understood that a manually-actuated version is also possible.

As seen best in FIG. 1, the mechanism 100 includes a motor 104 coupled a gear 106 of cross shaft 102 which thereby allows the motor to rotate the cross shaft 102. Each end of the cross shaft 102 also include a gear 110 that engage with a rack 108 that is fixed to the bottom of the slide-out room 101 (not shown in this figure). As the gears 110 rotate, they move the racks 108 (including channels 116A and track 118) into and out of the vehicle, thereby also moving the slide-out room 101 into and out of the vehicle.

Figure 4:
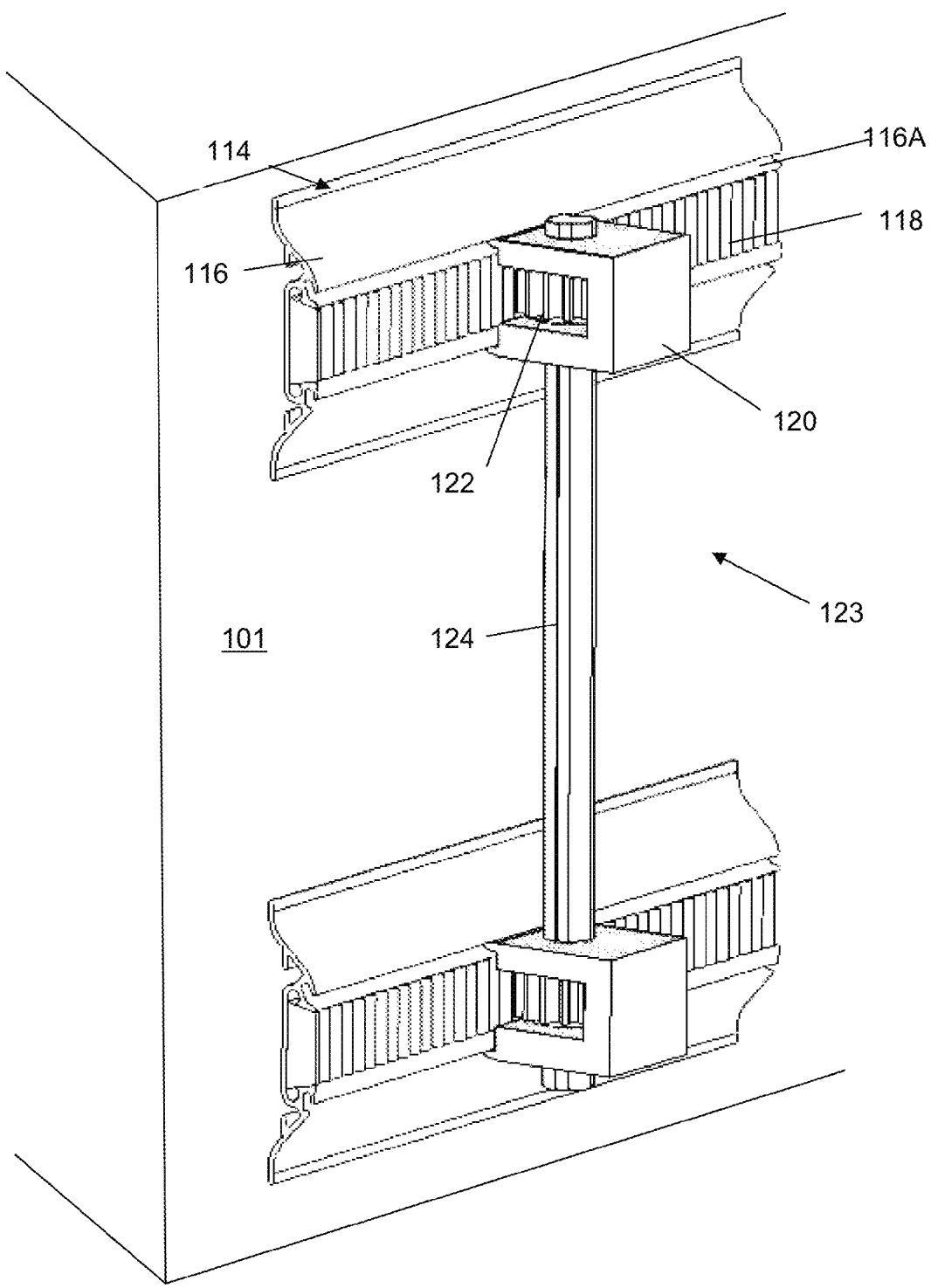
FIG. 4 illustrates a perspective view of a synchronizing mechanism according to the present invention.

FIG. 4 illustrates the equalizing or synchronizing assembly 123 which transfers some of the force/movement delivered to the lower portion of the slide-out room 101 to the upper portion of the room 101. Each side of the slide-out room includes an upper and lower gear rack 114, including a geared track 118. The track 118 of each rack 114 are engaged with upper and lower gears 122, each of which are respectively fixed to upper and lower portions of a vertical axle 124. The vertical axle 124 is rotatably fixed to an upper and lower bearing block 120, allowing both the axle 124 and gears 122 to rotate. This arrangement also allows the synchronizing components to support the room from tipping as it is extended or retracted.

Figure 2:
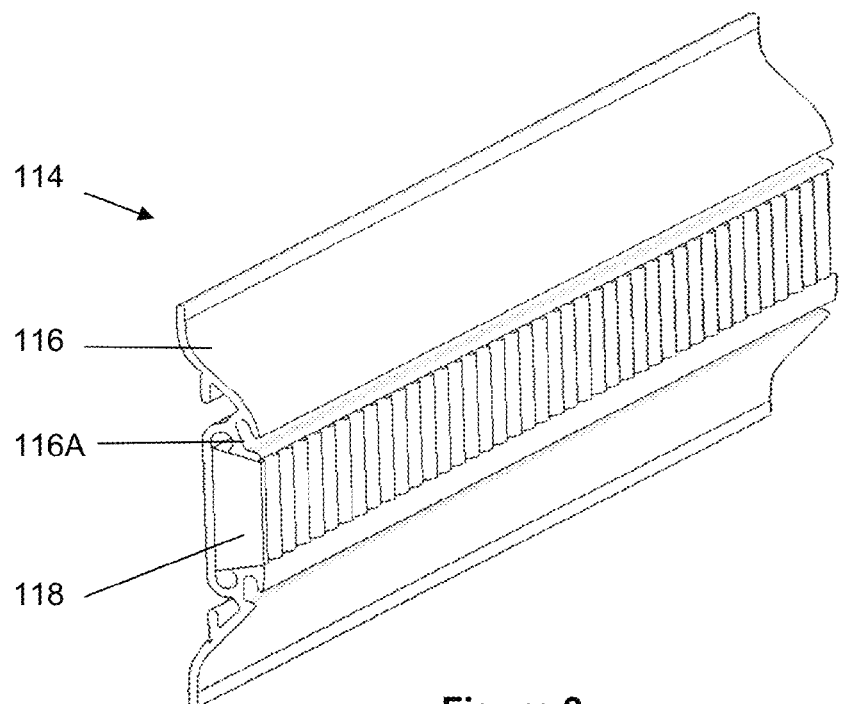
FIG. 2 illustrates a perspective view of a gear rack according to the present invention.
Figure 3:
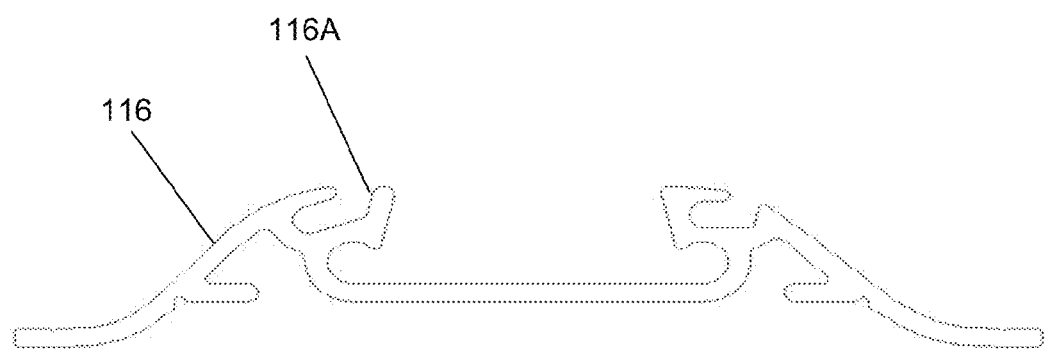
FIG. 3 illustrates a cross sectional view of the gear rack of FIG. 2.

The bearing blocks 120 are fixed to side channels 112 of the vehicle (shown in FIG. 1) but also have lips or ridges that engage channels 116A of the outer molding 116 of the rack 114 (best seen in FIGS. 2 and 3). In this respect, the bearing blocks 120 are fixed to the vehicle, but also generally maintain a close distance to the gear rack 114.

In operation, the motor 104 drives the cross shaft 102, causing the gears 110 to push the racks 108 (including track 118 and channels 116A) and therefore the bottom of the slide-out room 101. The synchronizing assembly 123 transfers some of the movement/force of the slide-out room 101 to an upper portion of the room 101 by causing the vertical axle 124, which is engaged with both the lower and upper gear racks 114, to rotate.

Figure 13:
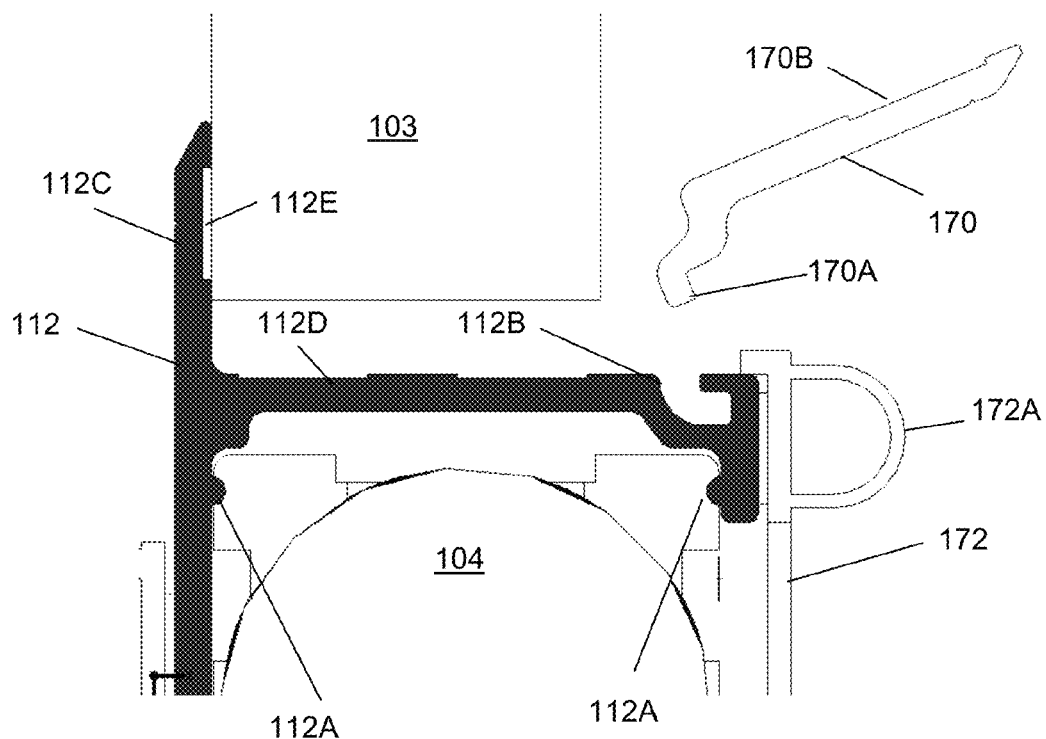
FIGS. 13-17 illustrates various views of a clamping flange for engaging a vehicle wall according to the present invention.
Figure 26:
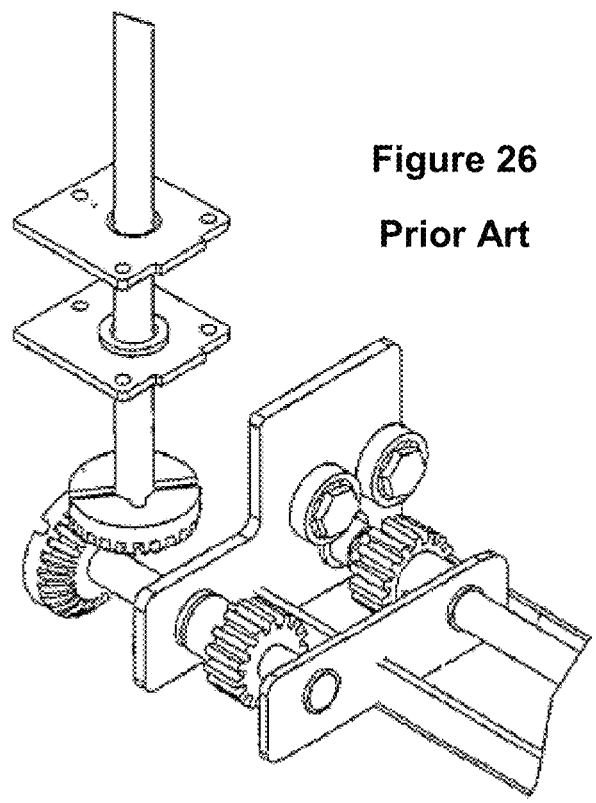
FIG. 26 illustrates a prior art gear linkage.

It should also be understood that the lower gear rack 114 could be located on the bottom surface of the slide-out room 101, as shown in several embodiments of U.S. Pat. No. 7,370,900, the contents of which are incorporated herein by reference. FIG. 13 of the present specification illustrates one such mechanism from the '900 patent (originally FIG. 26) which translates the movement of a bottom, horizontal gear rack to a top gear rack. In this arrangement, gears engage the lower, horizontal rack while two bearings (unlabeled) engage a groove of the rack to help maintain the gears in engagement with the rack.

Figure 5:
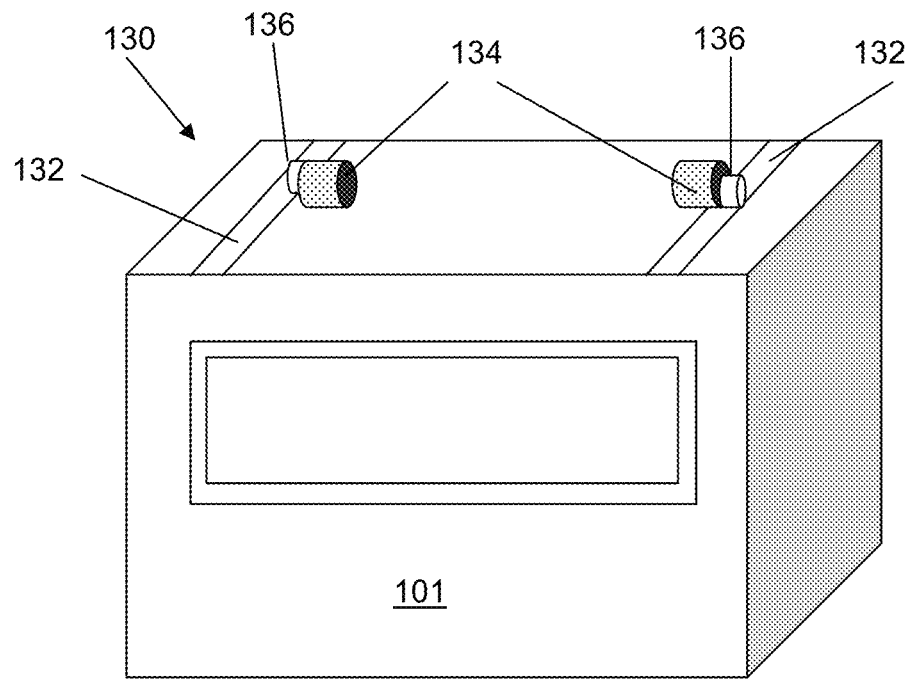
FIGS. 5 and 6 illustrate views of a slide-out mechanism according to the present invention.
Figure 6:
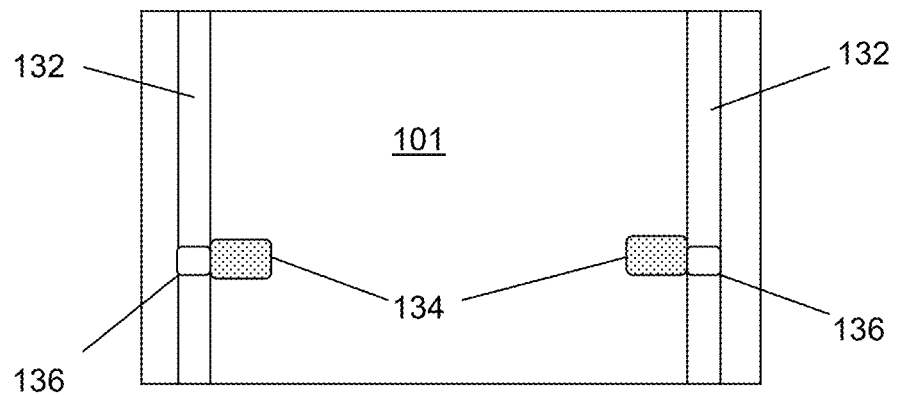

FIGS. 5 and 6 illustrates another embodiment of a slide-out room mechanism 130 having at least four gear racks located at various locations on the slide-out room 101. For example, in the figures, the gear racks 132 are located on the left and right sides of the top and bottom of the slide-out room 101. However, the gear racks 132 may alternately be located on the upper and lower areas of the left and right sides of the slide-out room 101, similar to those shown in the previous embodiment.

Each rack 132 is engaged with its own gear 136, each of which is driven by its own motor 134 (seen in best in the top view of FIG. 6). Each motor is controlled by a microcontroller or computer processor (not shown) which controls each of the motors 134 and maintains uniform or synchronous movement. The motors 132 may also be controlled to asynchronously rotate at specific points during the extension or retraction of the slide-out room 101 to, for example, cause the room 101 to be angled upwards or downwards for various design or alignment purposes.

Preferably, the motors 134 and gears 136 are mounted to the vehicle at a fixed position. Alternately, the motors 134 and gears 136 may be mounted to allow vertical movement. In this regard, vertical leveling systems may also be included in the slide-out mechanism 130 to increase or decrease the vertical height of the room 101 without dislodging the gear 136 from the rack 132. Additionally, the rack 132 and gear 136 may include a groove and lip arrangement similar to the previous embodiment for maintaining a constant distance between the rack 132 and the gear 136.

FIGS. 7-12 illustrate another embodiment of a slide-out mechanism 150 according to the present invention which is generally similar to the previously described mechanism 100. However, the slide-out mechanism 150 has two motors 104 mounted near a top side of each side channel 112 and engaging with the top gear rack 116.

Figure 11:
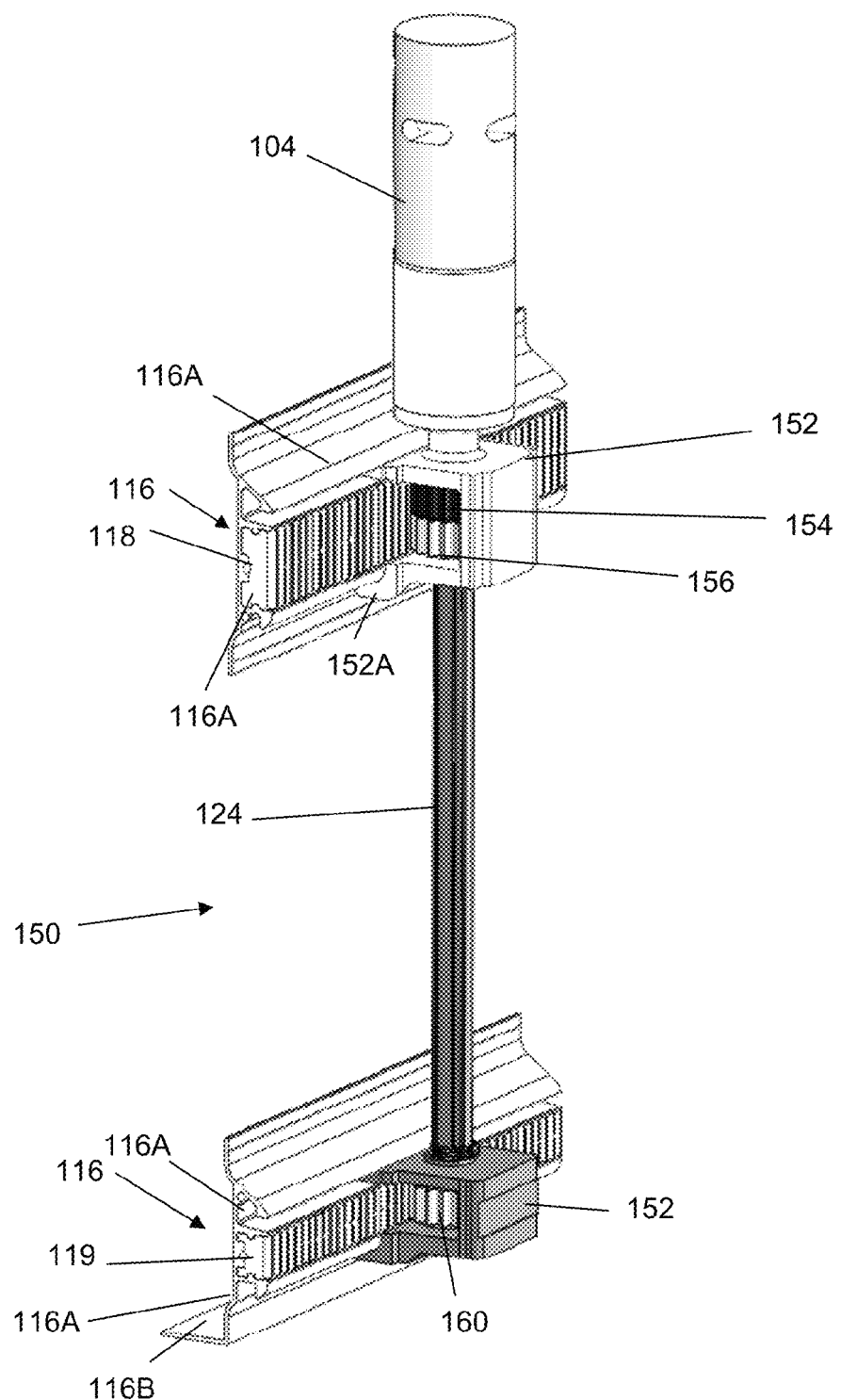
FIG. 11 illustrates a perspective view of a slide-out assembly including a synchronization mechanism according to the present invention.

As with the previous mechanism 100, the mechanism 150 includes a vertical axle 124 having a synchronizing gear 156 on its top and bottom end (see FIG. 11). The top synchronizing gear 156 engages the top gear rack 116 attached to the slide-out room 101 while the bottom synchronizing gear 160 engages the bottom gear rack 116. Hence, as the top synchronizing gear 156 rotates, the vertical axle 124 synchronously rotates the bottom synchronizing gear 160, thereby evenly distributing force between the top and bottom of the slide-out room 101.

Figure 10:
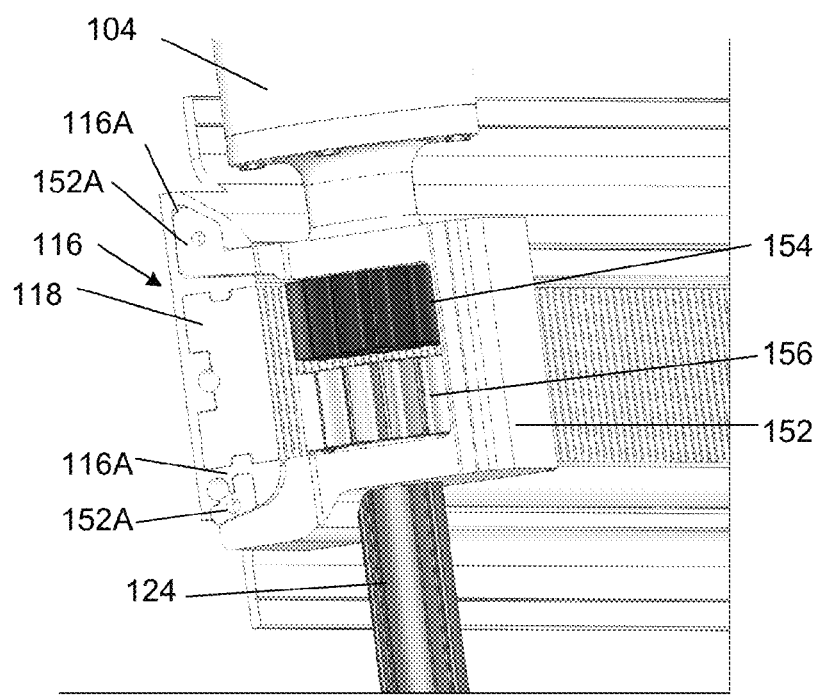

As seen best in FIGS. 10 and 11, the drive gear 154 of the motor 104, and the top synchronizer gear 156 share and engage the same gear track 118 of the top gear rack 116. Hence, the gear track 118 of the top gear rack 116 may be somewhat wider than the gear track 119 of the bottom gear rack 116. However, the drive gear 154 does not directly drive rotation of the top synchronizer gear 156 and no direct, rotating, mechanical drive linkage is provided between the two gears. In this respect, the synchronizer gears 156/160 and axle 124 do not directly receive force from the motor 104 or drive gear 154.

The gears 154, 156 and 160 are enclosed in one of two bearing blocks 152 which are fixed in place by two mechanisms. The first mechanism includes two raised lips or hooks 152A on the bearing blocks 152 that interlock with two grooves 116A of the gear racks 116. As seen best in FIGS. 9, 10 and 11, these grooves 116A are arranged on either side of the gear track 118 or 119 and helps maintain the bearing block 152 and its gears against the gear rack 116. Preferably, these grooves are shaped or angled such that water (e.g., rain) flows over their openings. For example, the upper groove has a generally inclined and vertical cross sectional shape and the lower groove has a generally vertical cross sectional shape. In this respect, the shape of the grooves 116A help prevent water from otherwise entering the vehicle.

Figure 12:
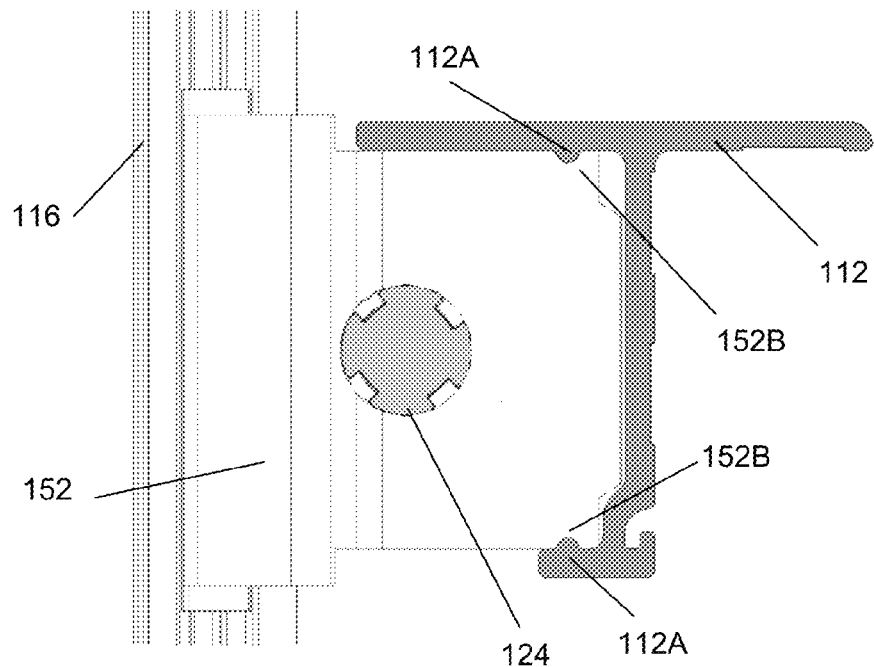
FIG. 12 illustrates a top view of a bearing bracket engaged with side channel according to the present invention.

With regard to the second mechanism, the bearing blocks 152 are directly fixed to the vertical channel 112 of the vehicle by tabs 112A on the channel 112 that engage with grooves 152B on the bearing blocks 152, as best seen in the cross sectional view of FIG. 12. The bearing blocks 152 and the channel 112 are further connected via adhesive or additional mechanical fastener (e.g., bolts). In this respect, the bearing blocks 152 are fixed to both the gear racks 116 of the slide-out room 101 and the channel 112 of the vehicle.

As best seen in FIG. 11, the lower gear rack 116B may include a perpendicular lower surface 116B. This surface 116B can be located along the underside of the slide-out room floor and allows the gear rack 116 to be evenly mounted.

Preferably, each of the embodiments of this specification include rollers that are mounded beneath the slide-out room (i.e., mounted either to the vehicle or to the bottom of the slide-out room. These rollers are oriented to support the weight of the room and facilitate its movement into and out of the vehicle.

Figure 14:
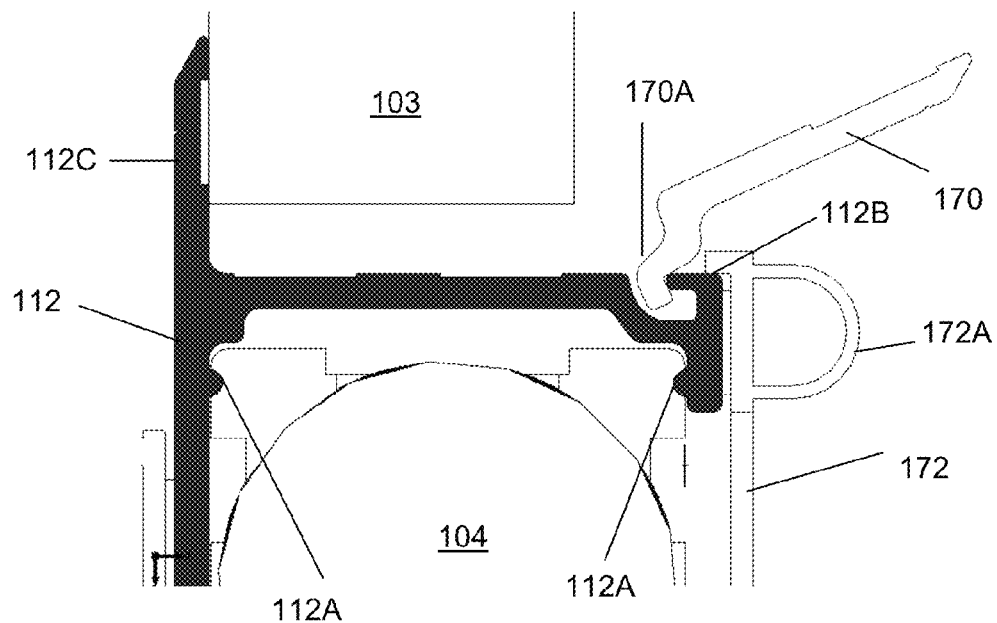
Figure 15:
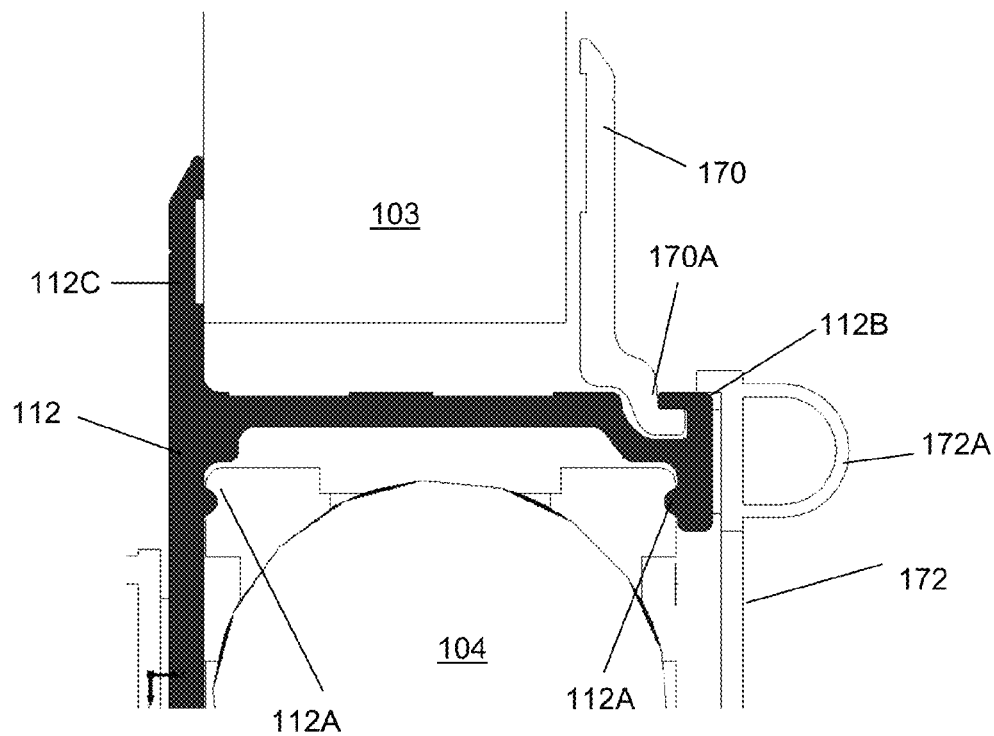

FIGS. 13-17, illustrate a clamp mechanism or removable inner flange for facilitating installation of the slide-out mechanism to a vehicle wall 103. As seen in FIG. 13, the cross sectionally "T" shaped side channels 112 include an outwardly flanged ridge 112C that is located against an outer surface of a vehicle wall 103, adjacent to the wall's aperture for the slide-out room 101. Depending on the size of the slide-out room 101 and its attached slide-out mechanism, the perpendicular portion 112D of the side channels 112 may be spaced apart from or flush against the edge of the wall 103. Next, an angled end 170A of a non-unitary flange or clamp member 170 is positioned into a mating groove 112B in the channel 112, as seen in FIG. 14. Generally, the mating groove 112B and angled end 170A are shaped such that they lock the clamp member 170 into a position that is generally parallel with flanged ridge 112C, thereby clamping the channel 112 on to the wall 103. In one embodiment, the groove 112B includes a sloping curve and an overhanging portion, while the angled end 170A includes an oppositely oriented curve shape to engage the overhanging portion. The clamp member 170 may be further screwed to the wall 103 via a plurality of screws. Preferably, the clamp member 170 extends substantially the length of the channel 112 or alternately a plurality of clamp members 170 with smaller lengths can be used. Alternately, the clamp member 170 may be connected to then channel 112 via a hinge mechanism that allows the member 170 to swing outwards, away from the wall 103.

Figure 16:
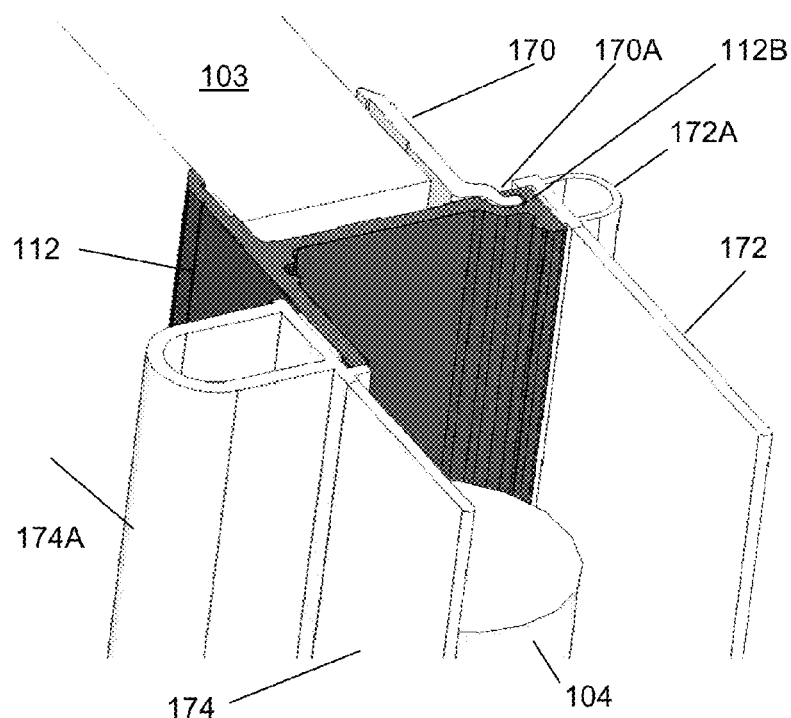
Figure 17:
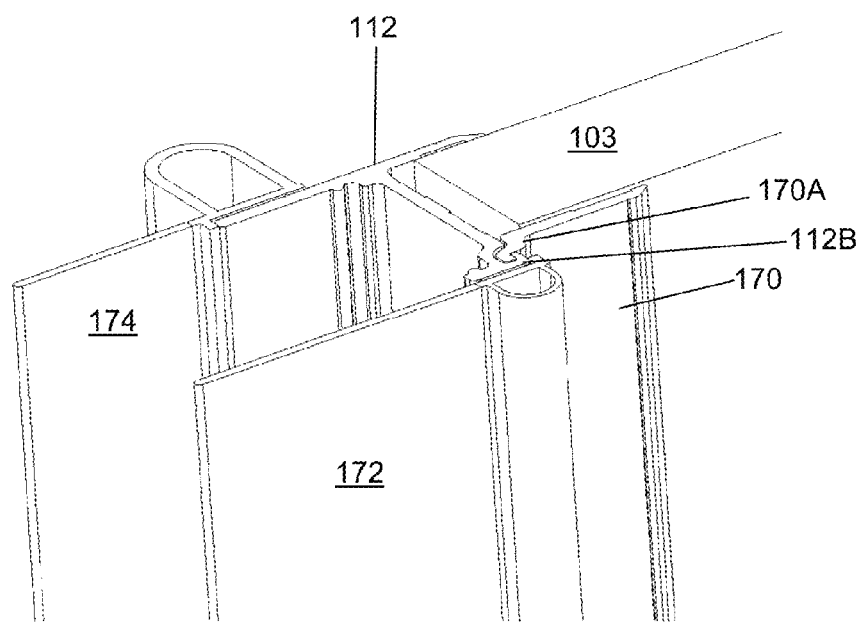

Turning to FIGS. 16 and 17, an outer seal flap 173 and an inner seal flap 172 can be attached to the channel 112 to help prevent weather elements, such as rain, from entering the vehicle. Preferably, both seal flaps 172A and 174A include hollow bumper portions 172A and 174A. In the case of the bumper 174A, this region contacts an inner surface of the slide-out room 101, preventing damage to the vehicle and further enhancing the seal of the flap 174 when the room 101 is in a retracted position.

In one embodiment, the slide-out system includes several features to easily replace the motor 104. Since the inner seal flap 172 is preferably composed of flexible material, such as rubber or silicone, it can be bent backwards by a user when inside the slide-out room 101 to expose the motor 104.

Figure 18:
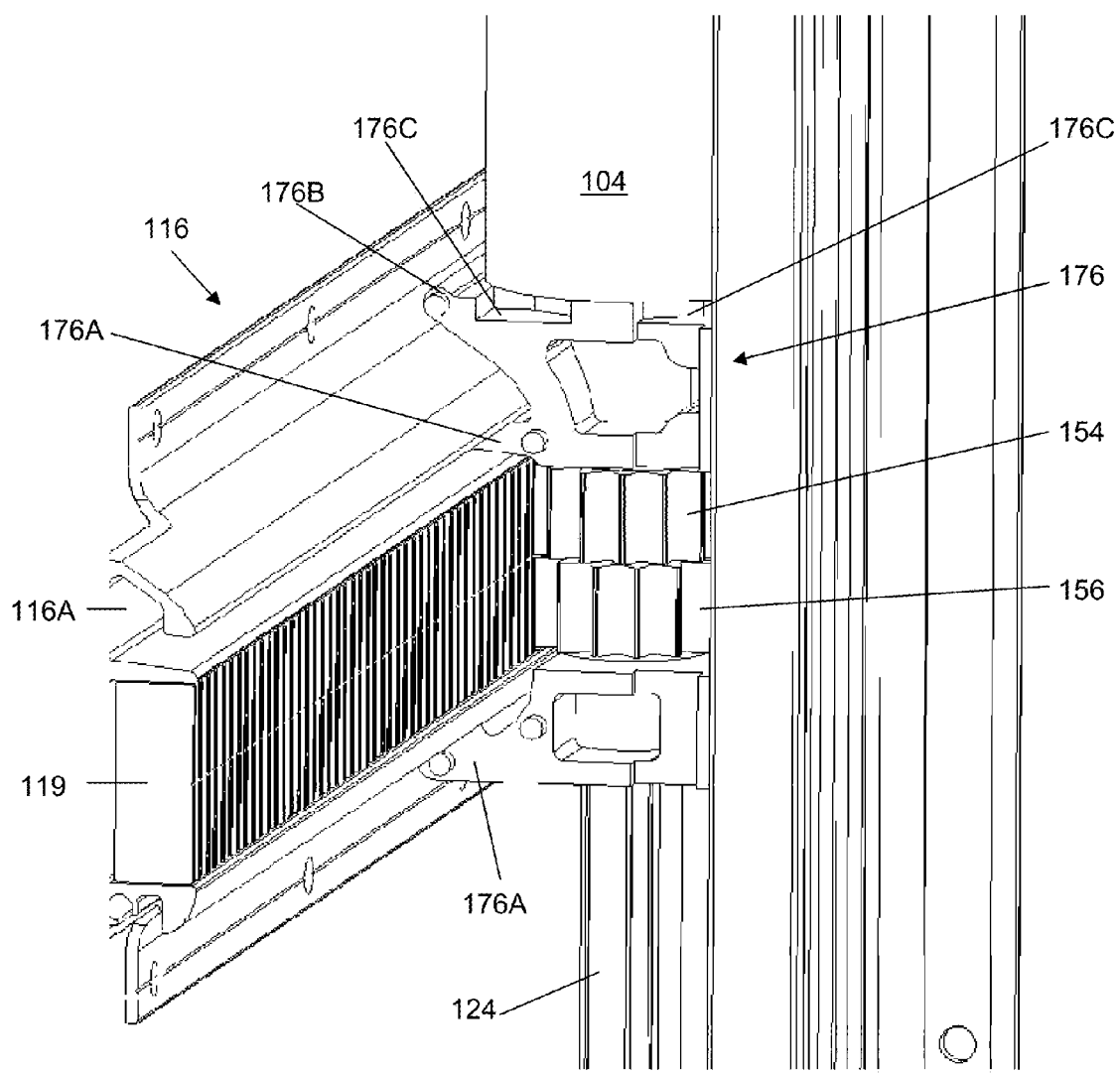
FIGS. 18-19 illustrate perspective views of a bearing and motor bracket according to the present invention.
Figure 19:
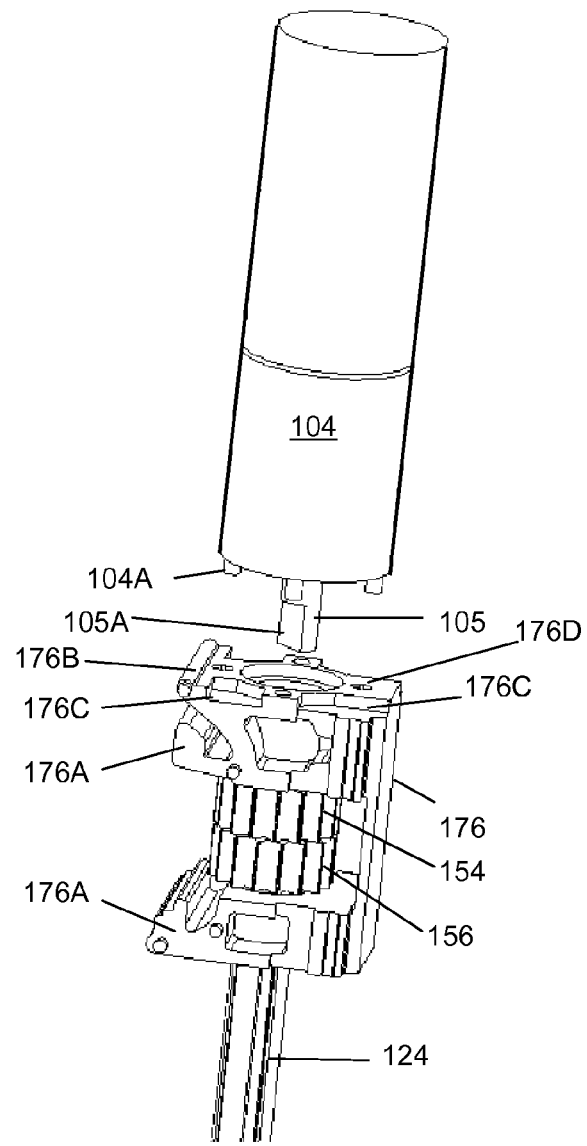

Additionally, a modified bearing block 176 can further facilitate easy removal and replacement of the motor 104. As seen in FIGS. 18 and 19, the bearing block 176 is similar to the previously described bearing blocks, including inner lips or hooks 176A that engage channels 116A and an additional outer lip 176B that bears against an outer surface of the gear rack 116. The top surface of the bearing block 176 includes a plurality of apertures 176D that are sized to accept matching posts 104A located on a lower surface of the motor 104. Hence, the motor 104 can be detached from the bearing block 176 via upward, vertical movement, without the need to remove any vertical restraint mechanism on the motor 104.

To further facilitate moving the motor 104 upward, one or more inset regions or depressions 176C (e.g., between 0.1 and 1 inch deep) are located on the top surface of the bearing block 176, allowing a user to insert a screw driver, or similar tool, between the depression 176C and the motor 104 to upwardly pry the motor 104. Preferably, the bearing block 176 includes two depressions along the inner side of the bearing block 176 such that one depression is accessible from an inside of the slide-out room 101 and another depression is accessible from an outside of the vehicle (i.e., by pulling back seal flap 174).

To allow easy insertion of a screw driver, the depressions 176C are preferably located along an outer edge of the bearing block 176.

Figure 20:
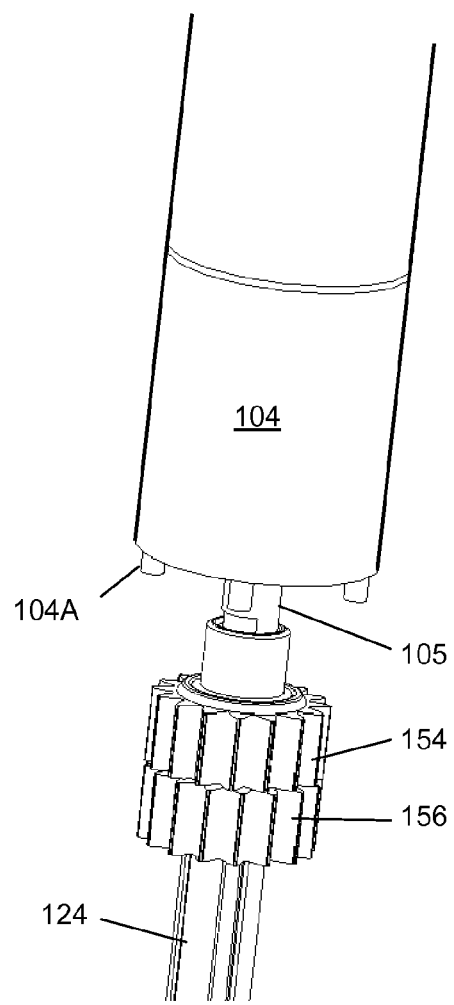
FIG. 20 illustrates a perspective view of a motor engaging a drive gear according to the present invention.
Figure 21:
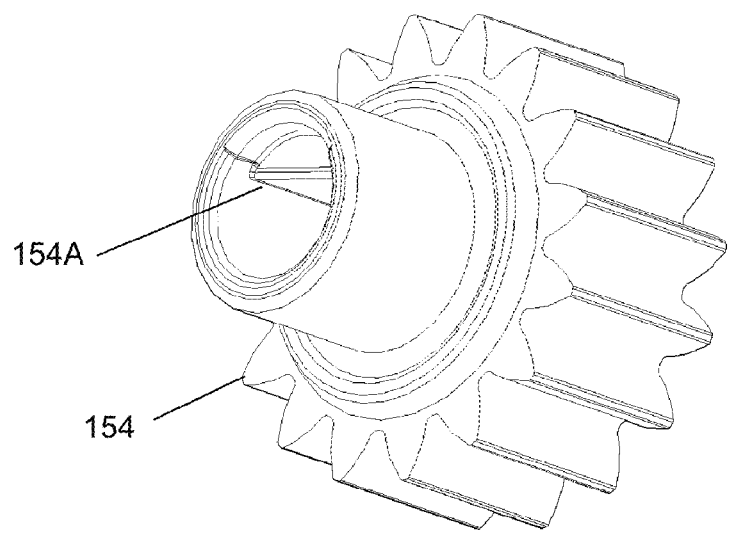
FIG. 21 illustrates a perspective view of a drive gear according to the present invention.

As further seen in FIGS. 20 and 21, the drive gear 154 preferably includes a stepped-down or recessed "D" fitting, sized to mate with the axle 105 and flat surface 105A. In other words, the drive gear 154 includes an inset arc shape 154A within its central passage. Hence, when the axle 105 of the motor 104 is placed on the drive gear 154, the axle 105 can partially enter the central passage of the gear 154, even if the flat surface 105A and the arc shape 154A are not aligned with each other. The axle 105 can then be rotated to align these surfaces, allowing the axle to pass fully into the drive gear 154.

In this respect, a motor 104 can be removed from an inside of the slide-out room by pulling back inner flap 172 to at least partially expose the motor 104, insert a tool into a depression 176C on a support or bearing block 176 and exert upwards force on the motor 104 such that the posts 104A move out of the apertures 176D of the block 176 and the axle 105 moves out of the central passage of the drive gear 154. The motor 104 can be removed from an outside of the slide-out room by pulling back outer flap 174 to at least partially expose the motor 104, insert a tool into a depression 176C on a support or bearing block 176 and exert upwards force on the motor 104 such that the posts 104A move out of the apertures 176D of the block 176 and the axle 105 moves out of the central passage of the drive gear 154. From either removal position, a new motor 104 can be moved within the channel 112 and its posts 104A can be aligned with apertures 176D and partially enter the central passage of the drive gear 154. Finally, the axle 105 can be rotated to align the surfaces 105A and 154A to a mating position (i.e., such that the flat portions of each component fit against each other), thereby allowing the axle 105 and posts to fully enter the gear 154A and apertures 176D, respectfully.

Preferably, the bearing block 176 is composed of a low friction material, such as Delrin. In another embodiment, the bearing block 176 includes a low friction coating, such as white lithium bearing grease spray, which is located on its inner surfaces to reduce friction between it and the gears 154, 156, and axle.

Figures 22, 23:
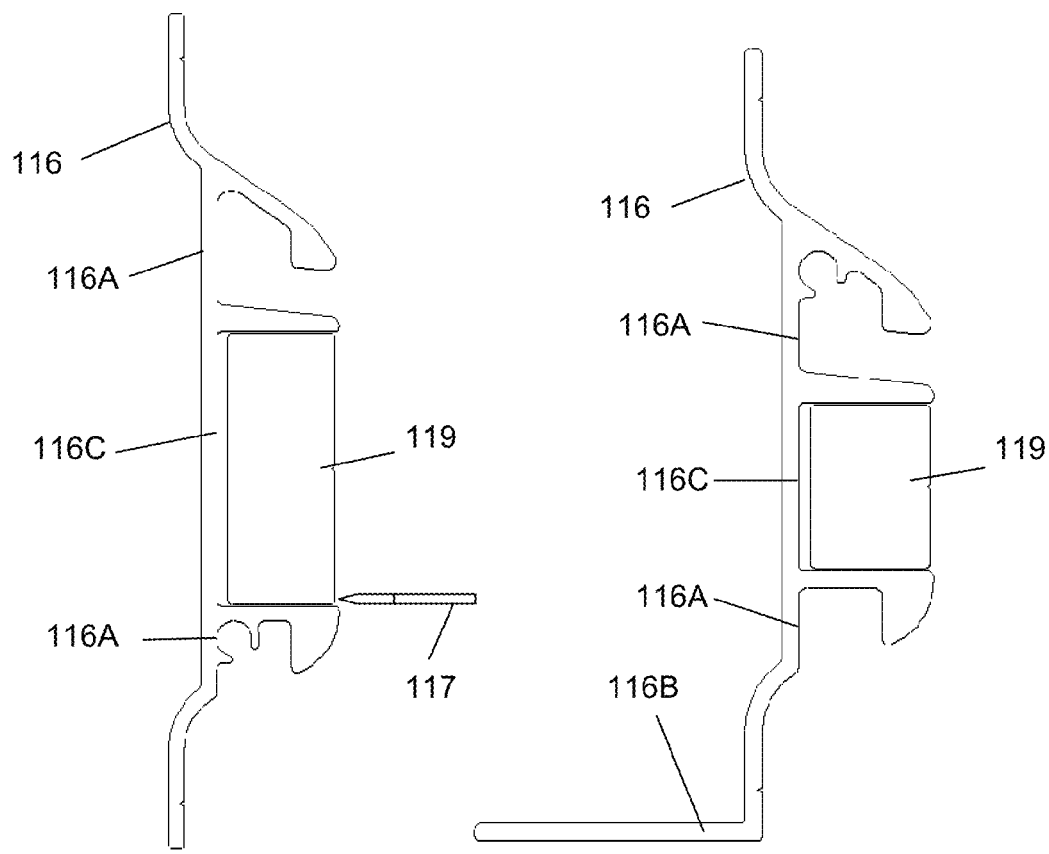
FIGS. 22-24 illustrate various views of gear racks according to the present invention.

As best seen in FIGS. 22 and 23, the channels 116A of the gear rack 116 have upper surfaces that at least partially cover and/or are angled downwards when mounted. This configuration helps reduce the amount of water that can accumulate when extended in various weather conditions. Additionally, the bearing block 176 includes an upper lip 176B which has a generally low clearance with the angled surface of the rack 116, thereby pushing off at least some of the water that may have accumulated while the room 101 was extended. Similarly, the fingers or lips 176A are shaped to substantially conform to the interior space of the cross sectional shape of the channels 116A with little clearance, thereby allowing the lips 176A to push some of the water out of the channels 116A.

In a preferred embodiment, the electrical wiring for the motor 104 is fixed within the channel 112 prior to attachment of the slide-out system to the room 101. It is often desirable to connect the motor to a vehicle's power supply near the bottom of the channel 112 and therefore positioning the electrical wires within the channel prior to installation of the system avoids the need of fishing the wires through the channel after installation on the room.

Figure 24:
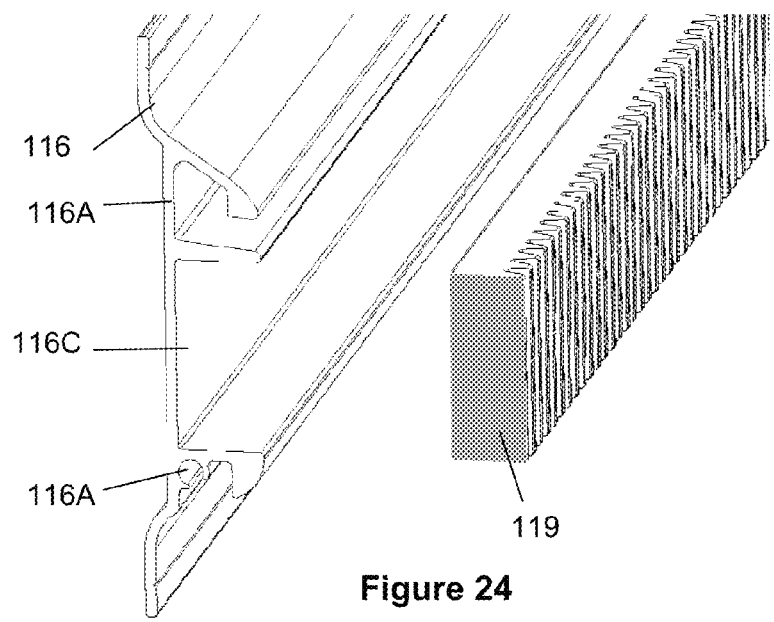
Figure 25:
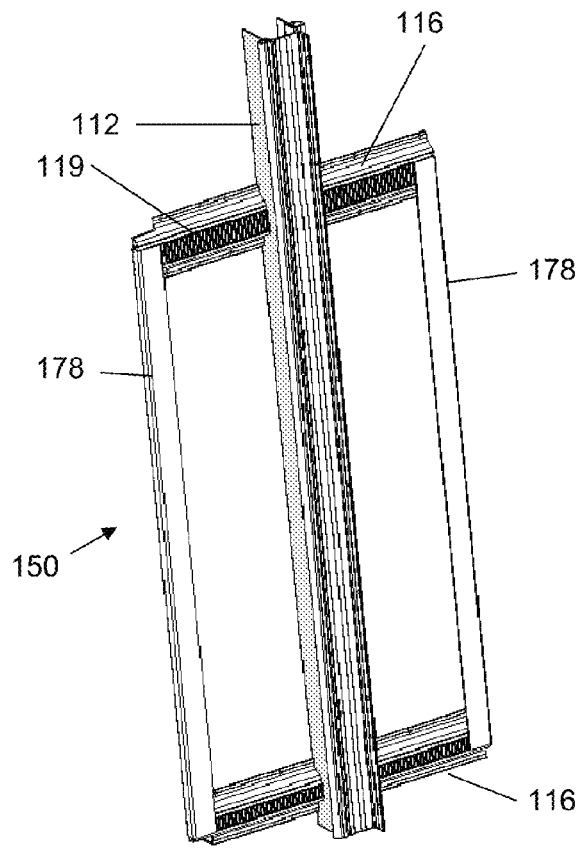
FIG. 25 illustrates a perspective view of a slide-out system with temporary stabilizing members for mounting according to the present invention.

FIGS. 22 and 23 illustrates cross sectional views of gear racks that are generally similar to the previously described gear racks of this specification. However, the present gear racks 116 includes a gear track mounting channel 116C with a relatively rectangular/square shape and generally smooth/uniform surfaces as compared to the rack 116 shown in FIG. 10, which includes raised lip surfaces on the lower and side portions. While these raised lip surfaces help maintain the track 119 in the gear rack 116 during normal use, they can make removal and replacement of the track 119 from the rack 116 difficult, especially when mounted on a slide-out room 101. In contrast, the smooth, rectangular surfaces of the track mounting channel 116C allows a user to insert a screw driver 117 (or similar tool) between the gear rack 116 and the track 119 and pry the track 119, breaking the adhesive bonds between the bottom and sides of the mounting channel 116C and the track 119. Without the additional support provided by the raised lips of the FIG. 10 rack 116, the prying movement more effectively breaks out and therefore removes the track 119, as seen in FIG. 24, allowing a user to remove the track 119 while the rack 116 is still mounted to the room 101.

In practice, a user can insert a screw driver 117 between a sidewall of track mounting channel 116C and a side of track 119, and apply perpendicular force relative to the two surfaces so as to cause separation of the surfaces and breaking an adhesive bond. This motion is continued along the length of the track 119 and option along an opposite side of the track 119 until the track 119 is free of the rack 116. Additionally, this action can be performed while the rack 116 is still mounted on the slide-out room 101, eliminating the need to remove the entire slide-out room 101 and slide-out system 150 from the vehicle.

In one embodiment, the entire slide-out system 150 is configured for assembly first to a slide-out room 101 that is located outside of a vehicle, and then later mounted to walls of a vehicle. To better stabilize and generally maintain the top and bottom gear racks 116 in a parallel orientation from each other, two temporary support members 178 are fixed to each end of the racks 116. Preferably, these support members are elongated and of the same length such that they can be connected to each end of the racks 116 (e.g., generally the length between the gears 156 and 160).

The slide-out system 150, including temporary support members 178 is located against a first outer sidewall of a slide-out room 101. Once the gear racks 116 are oriented in a desired position (e.g., parallel to the slide-out room's floor/ceiling), the gear racks 116 are fixed to the slide-out room 101 (e.g., with screws). Next, the temporary support members 178 are removed from the gear racks 116. The same process is repeated with a second slide-out assembly on the opposite side of the slide-out room 101.

Figure 7:
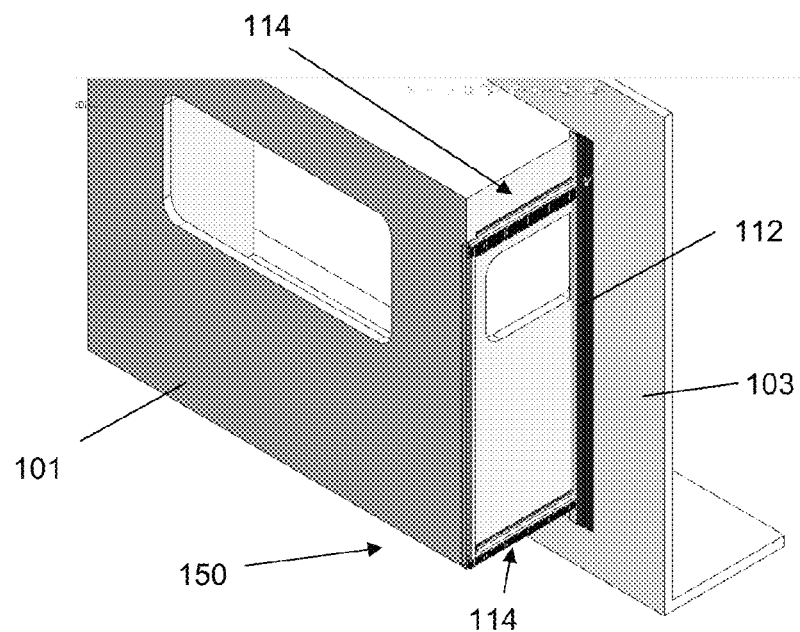
FIG. 7 illustrates a perspective view of a slide-out mechanism on a slide-out room within a vehicle according to the present invention.
Figure 8:
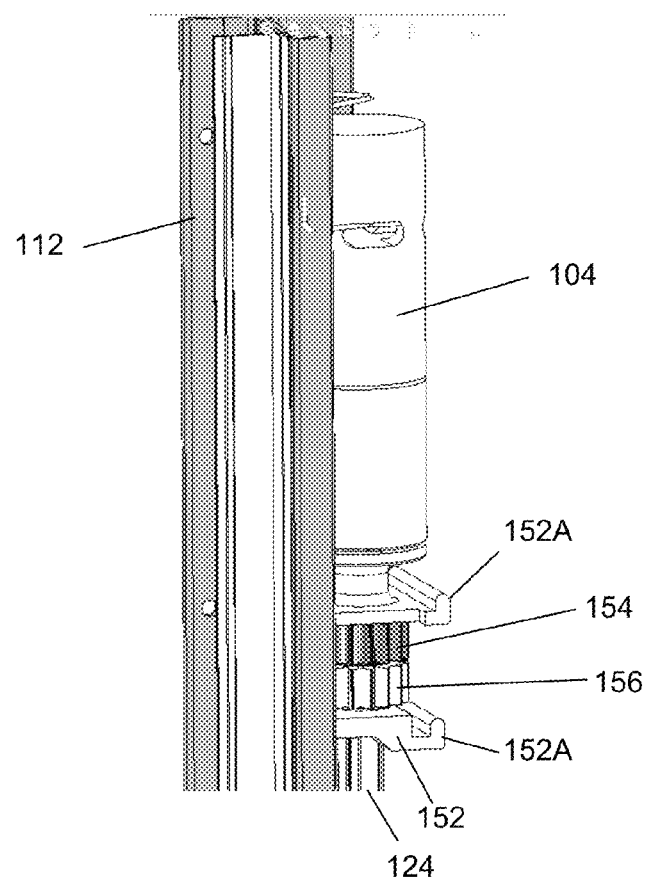
FIG. 8 illustrates 8-10 illustrate various views of a motorized drive gear and a synchronization system according to the present invention.
Figure 9:
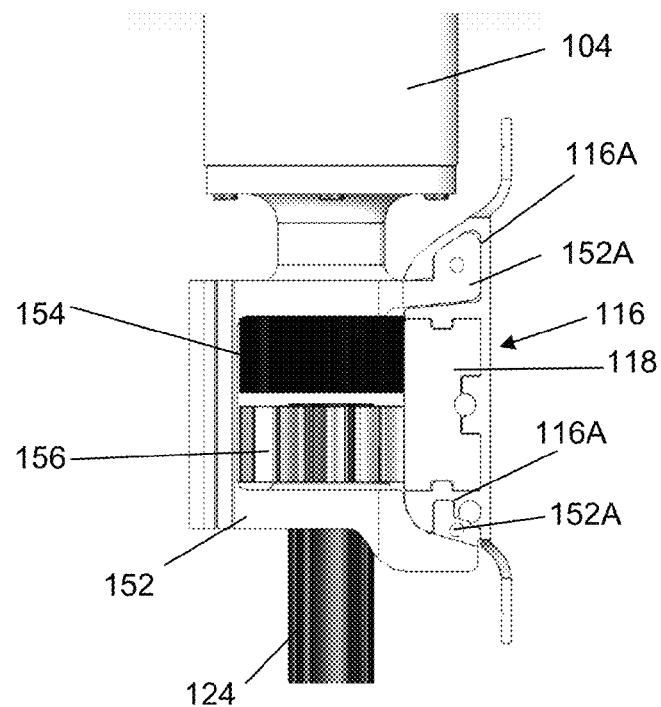

Next, the slide-out room 101, including two assemblies of the slide-out system 150 are lifted into an aperture in the sidewall of a vehicle (see FIG. 7). Preferably, the slide-out room 101 includes a plurality of low profile rollers on its bottom surface, allowing the room 101 to roll on an interior of the vehicle and maintain a desired height within the aperture. The outer flanges 112C of the side channels 112 are moved against an outer surface of the vehicle walls around the aperture. The channels 112 are clamped to the vehicle's wall by inserting clamp members 170 into the groove 112B of the channel 112, thereby pressing the clamp member 170 against an inner surface of the vehicle wall 103. Preferably, the outer flange 112C and clamp members 170 both include an elongated channel 112E and 170B respectively for receiving adhesive tape or liquid adhesives for adhering to the wall 103. Finally, the side channels 112 can be further secured to the sidewall 103 via screws through either the flange 112C, the clamp 170 or both members.

Figure 27:
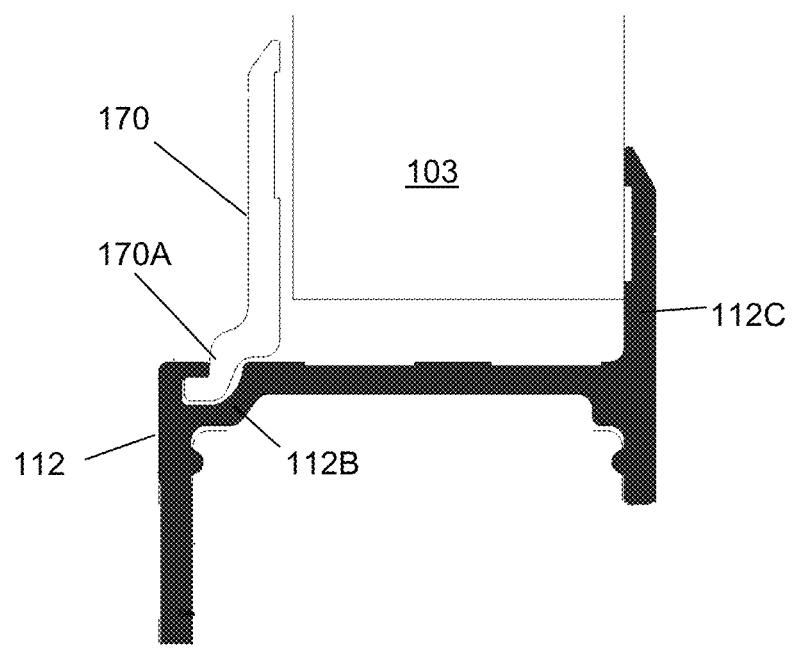
FIG. 27 illustrates an alternate channel member according to the present invention.

In an alternate channel embodiment, the locations of the fixed-position flange 112C and the clamp member 170 can be swapped or reversed, as seen in FIG. 27. In this respect, the slide-out system can be attached to the vehicle from the inside of the vehicle, such that the flange 112C engages an inner surface of the wall 103 and then the clamp member 170 is engaged with an outer surface of the wall 103.

It should be understood that different elements and assemblies of the embodiments described in this application can be replaced by those disclosed in U.S. Pat. No. 7,370,900, which is incorporated herein by reference. For example, the gear racks can be replaced by a geared belt, a chain, or other flexible horizontal member 190, as seen in FIGS. 28 and 29 (originally from the '900 patent). In another example, the axle 124 and gears 156 and 160 can be replaced by a vertical belt 194 and vertical gears 192. In another example, only the top or bottom gear racks may be replaced with belts or chains, allowing both to be used.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A slide-out system for a vehicle, comprising:
   a first horizontal gear rack configured for horizontal mounting on a sidewall of a slide-out room;
   a second horizontal gear rack located below said first gear rack configured for horizontal mounting on said sidewall of said slide-out room;
   a drive gear connected to a motor and engaged with said first horizontal gear rack;
   a synchronizing mechanism connected to and synchronizing movement of said first horizontal gear rack and said second horizontal gear rack; said synchronizing mechanism comprising a rotating vertical shaft having an upper synchronizing gear engaged with said first horizontal gear rack, and a lower synchronizing gear engaged with said second horizontal gear rack; and,
   an upper bearing block supporting said drive gear and said upper synchronizing gear such that said drive gear is spaced apart from said upper synchronizing gear with no direct, rotating, mechanical drive linkage.

2. The slide-out system of claim 1, wherein said motor is located above said drive gear.

3. The slide-out room of claim 1, wherein said top surface of said bearing block includes a depression located along an outer edge of said bearing block and underneath a portion of said motor.

4. A slide-out system for a vehicle, comprising:
   a first horizontal gear rack configured for mounting on an outer side of a slide-out room;
   a second horizontal gear rack located below said first gear rack and configured for mounting on said outer side of said slide-out room;
   an upper bearing block engaged with said first horizontal gear rack;
   a lower bearing block engaged with said second horizontal gear rack;
   a drive gear supported by said upper bearing block, connected to a motor, and engaged with said first horizontal gear rack;
   an upper synchronizing gear supported by said upper bearing block and engaged with said first horizontal gear rack;
   a lower synchronizing gear supported by said lower bearing block and engaged with said second horizontal gear rack;
   a rotating synchronizing shaft vertically connected to and synchronizing movement of said upper synchronizing gear with said lower synchronizing gear.

5. The slide-out system of claim 4, wherein said motor is located above and supported by said upper bearing block.

6. The slide-out system of claim 5, wherein said motor and a top surface of said upper bearing block are shaped to engage and disengage each other via vertical movement.

7. The slide-out system of claim 6, wherein said drive gear comprises a stepped-down D fitting that is sized to engage with a drive axle of said motor.

8. The slide-out system of claim 4, wherein said first horizontal gear rack and said second horizontal gear rack each include one or more grooves having an inclined cross sectional shape preventing substantial water accumulation within said one or more grooves.

9. The slide-out system of claim 4, wherein said first horizontal gear rack and said second horizontal gear rack each include one or more grooves; and wherein said upper bearing block and said lower bearing block each include one or more lip members shaped to substantially conform to an entire interior cross sectional space of said one or more grooves so as to push out any accumulated water during movement of said first horizontal gear rack and said second horizontal gear rack.

10. The slide-out system of claim 4, wherein said upper bearing block and said lower bearing block are engaged with a vertical channel.

11. The slide-out system of claim 10, further comprising a clamp member shaped to selectively engage said vertical channel and an inner surface of a vehicle wall.

12. The slide-out system of claim 10, further comprising a clamp member shaped to selectively engage said vertical channel and an outer surface of a vehicle wall.

13. The slide-out system of claim 4, wherein said first horizontal gear rack and said second horizontal gear rack each include a geared track adhered to a gear track mounting channel of each of said first horizontal gear rack and said second horizontal gear rack; wherein said gear track mounting channel has a substantially uniform rectangular shape.

14. The slide-out system of claim 4, wherein said motor is accessible and removable from an interior of a vehicle when said slide-out system is installed on a slide-out room of a vehicle.

15. A slide-out system for a vehicle, comprising:
   a first horizontal gear rack horizontally mounted on a first sidewall of a slide-out room;
   a second horizontal gear rack located below said first gear rack and horizontally mounted on said first sidewall of said slide-out room;
   a drive gear connected to a motor and engaged with said first horizontal gear rack;
   a synchronizing mechanism connected to and synchronizing movement of said first horizontal gear rack and said second horizontal gear rack; said synchronizing mechanism comprising a rotating vertical synchronizing linkage having an upper synchronizing gear engaged with said first horizontal gear rack, and a lower synchronizing gear engaged with said second horizontal gear rack;
   wherein said drive gear, said motor, and said synchronizing mechanism are fixed within a first vertical channel member, and said first vertical channel member is configured for mounting to a first vehicle wall.

16. The slide-out system of claim 15, wherein said vertical channel comprises a fixed flange portion and a clamp engagement portion; wherein said clamp engagement portion is shaped to accept and orient a clamp member in a position generally parallel to said flange portion.

17. The slide-out system of claim 16, wherein said flange portion and said clamp member each include a vertical channel containing adhesive.

18. The slide-out system of claim 16, wherein said fixed flange portion is oriented to engage an outer surface of a vehicle wall and wherein said clamp member is positioned to engage an inner surface of said vehicle wall.

19. The slide-out system of claim 15, further comprising:
a third horizontal gear rack configured for horizontal mounting on a second sidewall of a slide-out room;
a fourth horizontal gear rack located below said third gear rack and configured for horizontal mounting on said second sidewall of said slide-out room;
a second drive gear connected to a second motor and engaged with said third horizontal gear rack;
a second synchronizing mechanism connected to and synchronizing movement of said third horizontal gear rack and said fourth horizontal gear rack;
wherein said second drive gear, said second motor, and said second synchronizing mechanism are fixed within a second vertical channel member, and said second vertical channel member is configured for mounting to a second vehicle wall.

20. The slide-out system of claim 15, wherein said synchronizing mechanism further comprises a circular belt.

21. A slide-out system for a vehicle, comprising:
a first horizontal flexible member horizontally mounted on a sidewall of a slide-out room;
a second horizontal flexible member located below said first horizontal flexible member and horizontally mounted on said sidewall of said slide-out room;
a drive gear connected to a motor and engaged with said first horizontal flexible member;
a synchronizing mechanism connected to and synchronizing movement of said first horizontal flexible member and said second horizontal flexible member; said synchronizing mechanism comprising a rotating vertical synchronizing linkage having an upper synchronizing gear engaged with said first horizontal flexible member, and a lower synchronizing gear engaged with said second horizontal flexible member;
wherein said drive gear, said motor, and said synchronizing mechanism are fixed within a vertical channel member, and said vertical channel member is configured for mounting to a vehicle wall.

22. The slide-out system of claim 21, wherein said first horizontal flexible member and said second horizontal flexible member are gear racks, chains, belts or any combination thereof.

23. A slide-out system for a vehicle, comprising:
a drive mechanism attachable to a slide-out room;
a vertical channel supporting at least part of said drive mechanism; said vertical channel comprising a first flange spaced apart from a first mounting location;
a clamp member selectively engagable with said first mounting location, so as to orient said clamp member in a position substantially parallel with said first flange;
wherein said first flange is connectable to a first side of a vehicle wall and said clamp member is spaced apart from said first flange so as to engage a second side of said vehicle wall.

* * * * *